United States Patent [11] 3,548,742

[72] Inventors Wilhelm Johannes Seufert
 Korntal;
 Heinz Otto Wilhelm Woitzel, Stuttgart-Feuerbach, Germany
[21] Appl. No. 726,158
[22] Filed May 2, 1968
[45] Patented Dec. 22, 1970
[73] Assignee Werner & Pfleiderer
 Stuttgart-Feuerbach, Germany
[32] Priority May 12, 1967
[33] Germany
[31] No. 1,679,880

[54] APPARATUS FOR CONTINUOUSLY PROCESSING PULVERULENT OR GRANULAR FEEDS
13 Claims, 8 Drawing Figs.
[52] U.S. Cl. .................................................. 100/95,
 18/12, 100/146, 241/236
[51] Int. Cl. ..................................................... B30b 9/00,
 B30b 3/04
[50] Field of Search .......................................... 100/94, 95,
 96, 97, 98, 146, 167, 174, 155, 168, 176; 107/14;
 99/238, 237; 241/230, 235, 236; 18/16, 12

[56] References Cited
 UNITED STATES PATENTS
125,160 4/1872 Alexander .................... 241/236
176,176 4/1876 Guilder ........................ 241/236
251,660 12/1881 Wallace et al. ............... 100/155UX
600,823 3/1898 Pesant .......................... 100/176X
818,328 4/1906 Williams ....................... 241/236
996,958 7/1911 Wallick ......................... 241/236X
1,752,533 4/1930 Maxwell ....................... 100/176X
2,558,321 6/1951 Steinmetz ..................... 100/168X
3,385,531 5/1968 Kalwaites ..................... 241/236

Primary Examiner—Peter Feldman
Attorney—Cushman, Darby & Cushman

ABSTRACT: In apparatus for processing pulverulent or granular feeds to produce a plastic mass, of the type comprising a pair of counterrotating rollers displaced from each other to provide a working clearance gap, difficulties arise with temperature-sensitive feeds in that heat buildup tends to occur. This problem is avoided according to the invention in which process apparatus is provided comprising a pair of cooperating counterrotatable rollers of different diameter provided with intercalating peripheral helical profiles displaced from one another to provide a working clearance gap between the two rollers. The rollers are exposed along their entire length and are driven at different peripheral speeds, being of different diameters. Feed means are provided for introducing feed material into the working gap and the rollers convey the material in the axial direction of the rollers to at least one delivery end at which takeoff means are provided for removing processed material.

PATENTED DEC 22 1970 3,548,742

INVENTOR

Wilhelm Johannes Seufert
Heinz Otto Wilhelm Woitzel

BY Cushman, Darby & Cushman
ATTORNEYS

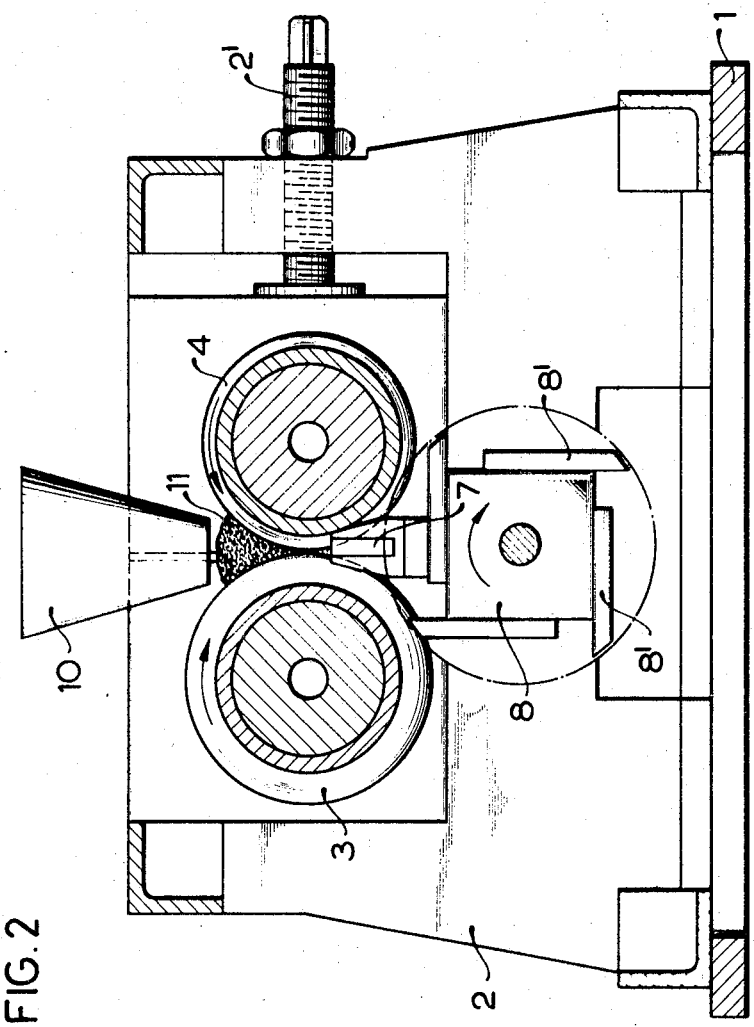

PATENTED DEC 22 1970 3,548,742

INVENTORS
WILHELM JOHANNES SEUFERT
HEINZ OTTO WILHELM WOITZEL
BY Cushman, Darby & Cushman
ATTORNEYS INVENTORS
Wilhelm Johannes Seufert
Heinz Otto Wilhelm Woitzel
BY Cushman, Darby & Cushman
ATTORNEYS

APPARATUS FOR CONTINUOUSLY PROCESSING PULVERULENT OR GRANULAR FEEDS

This invention relates to apparatus for continuously processing pulverulent and/or granular feeds, comprising a pair of counterrotatable rollers with intercalating profiles displaced from each other to provide a clearance gap.

The processing of different feeds for the production of plastic compositions presents a number of problems if the compositions produced for instance from pulverulent and/or granular feeds are temperature sensitive and which thus require the maintenance of specific temperatures to induce plastification and gelling.

For the plastification and gelling of such feeds use is made in practice of roller pairs which can be rotated inside a closed casing, and which have intercalating peripheral profiles. However, owing to the fixed disposition of the cooperating rollers relative to each other, the clearance of working gap between the rollers in such an arrangement is constant, and difficulties arise in the precise maintenance of prescribed working temperatures due to the generation of heat during the process of plastification and gelling, which heat must be extracted through the casing walls. For this reason it has previously been proposed to provide a casing which functions as a heat exchanger. Thermal control is particularly difficult when the treated material cannot be evenly heated along the entire length of its treating path and the temperature varies as the treatment proceeds.

The invention provides apparatus which, despite structural simplicity and the absence of a casing and special cooling means, permits the desired degree of plastification of the treated feed to be easily achieved whilst at the same time ensuring that the homogeneity of the composition is optimal and the product is discharged from the apparatus continuously.

The invention consists of apparatus for continuously processing pulverulent or granular feeds or mixtures thereof to produce a plastic composition, comprising a pair of cooperating counterrotatable rollers provided with intercalating peripheral profiles displaced from each other to provide a working clearance gap between the two rollers, the said rollers being exposed along their entire working length; means for driving the said two rollers at different peripheral speeds; feed means for introducing feed material into the said working gap, and one or more takeoff element(s) for removing processed material issuing from the said rollers.

In operation, one of the rollers functions as a working roller, and conveys the composition being processed in a thin film which is conveyed to the one or more takeoff element(s).

The fact that the rollers are freely exposed along their entire working length and that the compositions are processed in thin layers, particularly in thin boundary layers, ensures that merely by adjusting the temperature of the working roller according to the nature of the treated feed optimum shearing forces can be applied without any risk of the quality of the treated composition being impaired during treatment, for instance by the buildup of inadmissibly high temperature peaks. Thus shear velocities exceeding 3 metres/second may be applied.

If desired, the entire working length of the rollers may be divided into a plurality of differing working sections, each section having differing working characteristics, the said sections comprising roller portions for instance of differing diameter, and/or width, and/or configuration of the intercalating portions. These features, together with the adjustability of the clearance gap between the rollers, permit the working length of the rollers and hence the residence or treatment time of the component materials as well as the degree and efficacy of the shearing forces to be controlled.

Adjustment of the width of the working clearance gap between the rollers is preferably effected by radially moving one or both rollers in their pedestal bearings. Alternatively the arrangement may be such that the width of the clearance gap along the entire working length of the rollers or within the length of certain working sections thereof varies, for instance in that it uniformly diminishes or increases. The working length of the rollers may be divided in the middle into two sections, the said two sections being provided with profiles resembling screw threads of opposite hand running from the middle of the rollers uniformly towards each end. In such a construction the components that are to be treated may be fed to the two rollers substantially in the middle of their working length, the composition being treated and conveyed from the middle towards the two ends of the rollers. Alternatively the working length of the rollers may be divided into a plurality of sections having screwlike profiles of hands in the same direction, the several working sections being formed by rings keyed to a shaft and provided on their peripheries with profiles in the form of screw threads which are continuous along all the sections.

With rollers having two profiles each resembling a screw thread of opposite hand, a feed means may be disposed adjacent the dividing line between the sections, and two takeoff means provided, one at each end of the pair of rollers. In order to permit the working length of the rollers of such configuration to be easily selectably varied, two feed means may be provided, one associated with each of the said sections, each of the said feed means being mounted for movement along the length of the working clearance gap in its associated section.

The shape of the takeoff element(s) located below the centerline between the two rollers for the reception of the composition issuing in a direction parallel to the longitudinal axes of the two rollers, will primarily depend upon the nature of the treated materials. Each of the takeoff elements may be associated with a granulating unit comprising granulating knives revolving about an axis which may be parallel or normal to the longitudinal axes of the rollers.

As already mentioned, the shearing and working speed of the working roller in the proposed apparatus may exceed 3 meters/sec. This high working speed, in conjunction with the adjustment for given feeds of a suitable working gap between the profiles of the two rollers and the provision of a favorable type of surface of the profiles of the working roller and/or the cooperating roller, ensures that optimum results can be achieved with regard to plastification and/or gelling of a particular composition as well as with respect to temperature control and continuous delivery of the product.

The rollers, not being enclosed in a casing, allow the treated composition to be effectively and quickly degassed should this be necessary, and at the same time the entire process can be continuously directly observed. Furthermore all the components which come into contact with the composition are readily accessible for cleaning. The combination of these features is particularly advantageous when combined with the form of construction of the machine according to the invention, allowing optimum throughput and high quality of product.

Embodiments of the invention are hereinafter described and illustrated in the accompanying drawings, in which:

FIG. 2 is a cross section of the apparatus according to FIG. 1;

Figure 1:
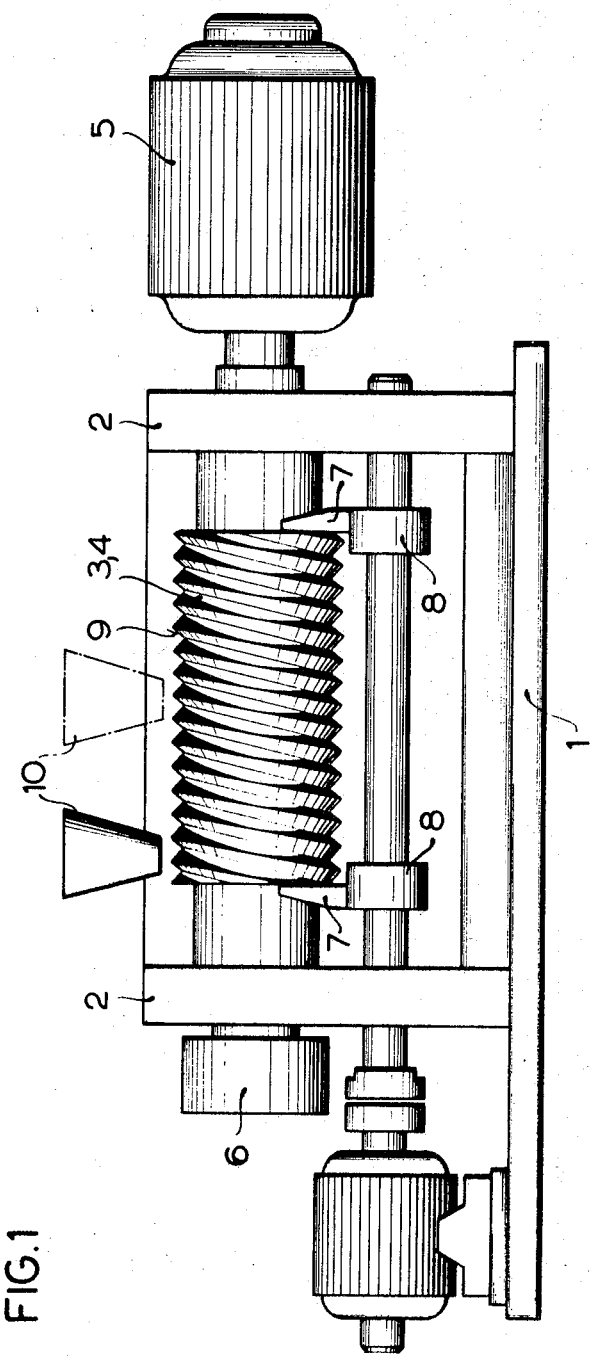
FIG. 1 is a general elevational view of apparatus for continuously processing plastic compositions according to the invention.

Referring to the drawings, spaced a given distance apart on a base plate 1 are two pedestal bearings 2 between which two rollers 3 and 4 are mounted for rotation in opposite directions.

The rollers are driven by a motor 5 with the possible interposition of gear means and/or of a clutch 6.

Referring to FIG. 2, the center distance between the two rollers 3 and 4 may be adjusted by elements 2' on the two pedestals 2 to provide a clearance gap between the two rollers that is optimal for treating a particular feed.

In FIGS. 1 and 2 of the drawings, in the region of the clearance gap centrally between the two rollers a takeoff element is provided which delivers the material issuing axially in the form of a continuous extrusion into a granulating device 8. The latter consists of a plurality of rotating knives 8', and in the illustrated embodiment the axis of rotation of the knives is parallel to the axes of the two rollers 3 and 4, although it may be arranged normal to the said axes, if desired.

Figure 2A:
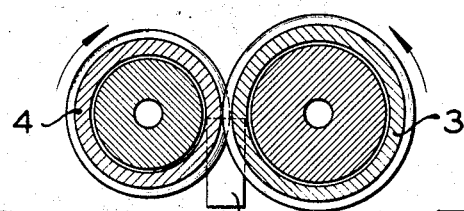
FIG. 2a is a cross section of a pair of rollers which may be used in apparatus according to the invention.

In FIG. 2a, the diameter of one of the rollers of the pair of rollers is shown to be greater than that of the other roller.

Figure 3:
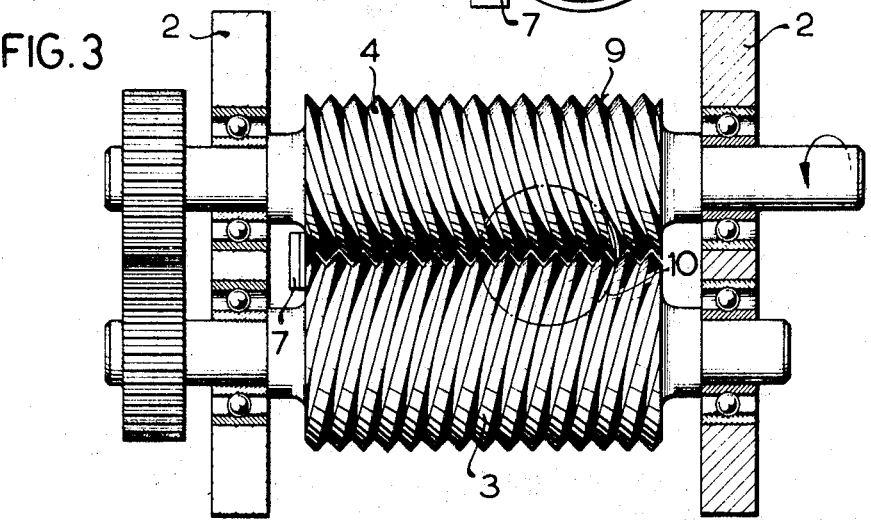
FIG. 3 is a simplified plan view of the pair of rollers in apparatus according to FIG. 1.

In FIG. 3 the entire exposed working length of the rollers 3 and 4 between the two pedestal bearings is provided with a profiling 9 resembling screw threads, said threads being pitched to run from a feed means 10, indicated in FIG. 3 of the drawings in dot-dash lines, to a takeoff element 7 at the other end of the rollers. FIG. 1 discloses that the feed means 10 is located above the working gap of the rollers and that it is adjustably movable along the length of the rollers 3 and 4.

This feature permits the effective length of the rollers 3 and 4 and the length of the path through which the treated material must travel as well as its residence time between the profiles of the rollers 3 and 4 to be selected and controlled.

Figure 4:
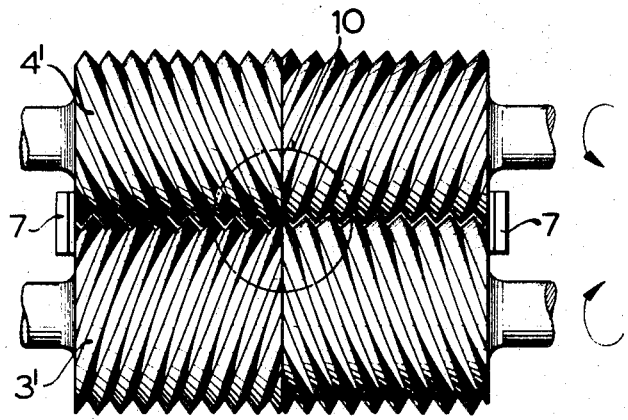
FIG. 4 is a modified form of construction of a pair of rollers, seen from above.
Figure 5:
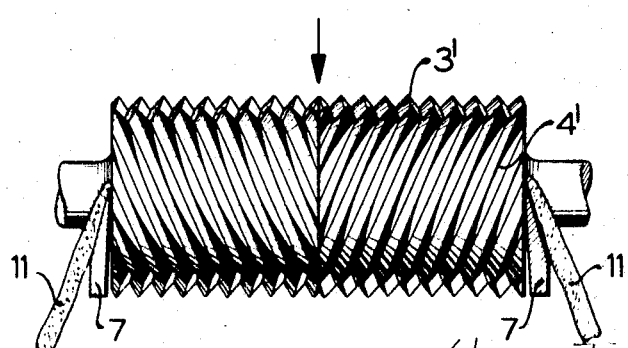
FIG. 5 is a view of the roller pair according to FIG. 4.

As shown in FIG. 4 these profiles may be modified to represent screw threads which are of opposite hand from the center of the rollers towards each end. In such instance takeoff elements 7 for the reception of the continuously extruding composition 11 are provided at each end of the rollers, as indicated in FIG. 5 of the drawings. In this embodiment the center distance between the two rollers 3' and 4' can likewise be varied by a simple device in the form of an adjusting means 2' of the kind shown in FIG. 2.

Figure 6:
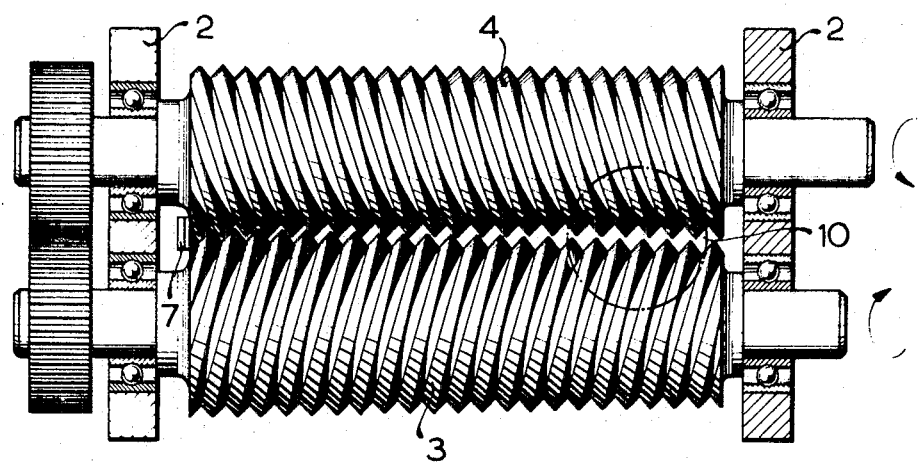
FIG. 6 is a plan view of another modified form of construction of a roller pair.

In the embodiment illustrated in FIG. 6 of the drawings the clearance gap between the cooperating roller profiles is arranged to diminish from the feed means 10 to the takeoff element 7, the clearance gap thus having a taper along the entire length or at least the working length of the rollers.

Figure 7:
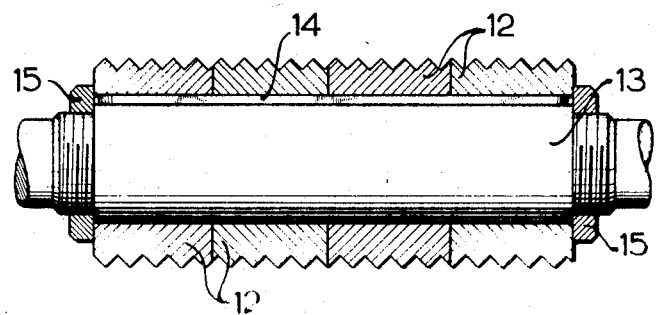
FIG. 7 is a detail of a working roller in apparatus according to FIG. 1.

FINally FIG. 7 illustrates another possible embodiment of one or both rollers in which the working length is divided into separate sections or stages, each stage being formed by a ring 12 which is mounted on a shaft 13 and rotatably coupled therewith by keys 14. Axially the several rings 12 may be located by supplementary discs 15 or the like, The width of the several working stages defined by the rings 12 as well as the diameter of the rings, may be selectably varied.

The entire working length of the rollers may comprise only two sections mounted on the shaft 13 and affixed to same in the manner hereinbefore described. This is an arrangement which has the advantage of permitting the nature of the profiles, and particularly the nature of their surface, such as their roughness, and possibly also the material of which they are made to be different. The rollers or possibly only the working roller maybe tempered in conventional manner.

When the apparatus is started up the material constituting the feed is charged by the feeder element 10 into the working gap between the two counterrotating rollers 3 and 4. The feed is thus quickly plastified or gelled by being subjected to the high shearing velocities of about 3 meters/sec., a very thorough treatment of the composition being assured by its repeated passage in thin layers through the working gap. At the same time the composition is reliably degassed and the maintenance of desired limiting temperatures presents no problems. Moreover, the composition can be kept under visual observation throughout its progress along the length of the rollers and, if desired, the shear velocity and/or the temperature can be varied should this be necessary.

A takeoff element 7 which may be provided at one or both ends of the rollers according to the nature of the roller profiles, may be arranged to convey the continuously issuing finished composition, which appears in the form of a continuous extrusion, into a granulating device, as already described, or to some other desired processing machine.

Which of the two rollers is arranged to function as the working roller in apparatus according to the invention depends upon the nature of the processed material. In any event the composition is carried on the working roller in the form of thin boundary films through the working gap and continues to be further conveyed as a continuously freshly reconstituted film.

We claim:

1. Apparatus for continuously processing pulverulent or granular feeds or mixtures thereof to produce a plastic composition, comprising a pair of cooperating counterrotatable rollers provided with intercalating peripheral helical profiles displaced from one another to provide a working clearance gap between the two rollers, the said rollers being exposed along their entire working length, means for driving the two rollers at different peripheral speeds, feed means for introducing feed material into the working gap, said rollers serving to convey the material in the axial direction of the rollers to at least one delivery end; and takeoff means at said end for removing processed material conveyed thereto by the said rollers.

2. Apparatus for continuously processing pulverulent or granular feeds or mixtures thereof to produce a plastic composition, comprising a pair of cooperating counterrotatable rollers provided with intercalating peripheral profiles displaced from each other to provide a working clearance gap between the two rollers, said rollers being exposed along their entire working length; means for driving the said two rollers at different peripheral speeds; feed means for introducing feed material into the working gap, each of said rollers being divided into two sections, the sections having a profile resembling a screw thread of opposite hand to each other, and in which the said feed means is disposed adjacent to the dividing line between the two rollers, and takeoff means provided at each end of the said pair of rollers for removing processed material issuing from the rollers.

3. Apparatus for continuously processing pulverulent or granular feeds or mixtures thereof to produce a plastic composition, comprising a pair of cooperating counterrotatable rollers provided with intercalating peripheral profiles displaced from each other to provide a working clearance gap between the two rollers, the said rollers being exposed along their entire working length; means for driving the said two rollers at different peripheral speeds; feed means for introducing feed material into the said working gap, each of said rollers being divided into two sections, the sections having a profile resembling a screw thread of opposite hand to each other, and in which a takeoff means is associated with each of the said two sections. The said feed means being mounted for movement along the length of the working clearance gap of the said pair of rollers.

4. Apparatus for continuously processing pulverulent or granular feeds or mixtures thereof to produce a plastic composition, comprising a pair of cooperating counterrotatable rollers provided with intercalating peripheral profiles displaced from each other to provide a working clearance gap between the two rollers, the said rollers being exposed along their entire working length; of each of said rollers has at least one profile resembling a screw thread, and in which the rollers are each divided into a plurality of sections; each section having a profile resembling a screw thread, and there being sections of similar hand to each other, and in which said feed means is disposed to one end of said pair of rollers and said takeoff means is disposed at the opposite end of the said pair of rollers.

5. Apparatus for continuously processing pulverulent or granular feeds or mixtures thereof to produce a plastic composition, comprising a pair of cooperating counterrotatable rollers provided with intercalating peripheral profiles displaced from each other to provide a working clearance gap between the two rollers, the said rollers being exposed along their entire working length; means for driving the said two rollers at different peripheral speeds; feed means for introducing feed material into the working gap, at least one takeoff element for removing processed material issuing from said rollers, and in which said takeoff element is disposed below the center lines of said rollers in a position where the processed material issues from the end of said rollers in a direction parallel to the longitudinal axes of the rollers.

6. Apparatus according to claim 4, in which said feed means is mounted for movement along the working clearance gap of said pair of rollers.

7. Apparatus according to claim 1, in which said rollers are each formed by rings having a profile resembling a screw thread fixedly mounted on a shaft.

8. Apparatus according to claim 5, in which said takeoff element is associated with a granulating device comprising at least one knife rotatably mounted about an axis parallel to the longitudinal axes of the rollers.

9. Apparatus according to claim 5, in which said takeoff element is associated with a granulating device comprising at least one knife rotatably mounted under the takeoff element.

10. Apparatus according to claim 1, in which the surface formation of the profiling of one of the rollers is different from the surface formation of the surface formation of the profiling of the other roller.

11. Apparatus according to claim 1, wherein the rollers are substantially horizontally arranged and in which the diameter of at least one of the said rollers changes progressively along its entire length, with the working clearance gap between said rollers varying continuously along its length.

12. Apparatus according to claim 1, comprising a feed means nearer one end of the roller pair than the other end; said takeoff means being at said other end.

13. Apparatus according to claim 1, wherein said feed means is adjustable lengthwise of the said rollers.